US010815973B2

(12) United States Patent
Flach (10) Patent No.: US 10,815,973 B2
(45) Date of Patent: Oct. 27, 2020

(54) ROTOR BLADE OF A WIND TURBINE AND METHOD FOR RETROFITTING A LIGHTNING PROTECTION DEVICE OF A ROTOR BLADE (71) Applicant: SENVION GmbH, Hamburg (DE)

(72) Inventor: Christian Flach, Österrönfeld (DE)

(73) Assignee: Senvion GmbH, Hamburg (DE)

( * ) Notice: Subject to any disclaimer, the term of this patent is extended or adjusted under 35 U.S.C. 154(b) by 178 days.

(21) Appl. No.: 16/056,882

(22) Filed: Aug. 7, 2018

(65) Prior Publication Data
US 2019/0040846 A1 Feb. 7, 2019

(30) Foreign Application Priority Data
Aug. 7, 2017 (DE) .......................... 10 2017 007 371

(51) Int. Cl.
F03D 80/30 (2016.01)
(52) U.S. Cl.
CPC .......... F03D 80/30 (2016.05); F05B 2220/30 (2013.01); F05B 2230/80 (2013.01); F05B 2240/221 (2013.01); F05B 2250/231 (2013.01)
(58) Field of Classification Search
CPC ...................................................... F03D 80/30
See application file for complete search history.

(56) References Cited

U.S. PATENT DOCUMENTS

2009/0196751 A1* 8/2009 Jacobsen ............... F03D 1/0675 416/146 R
2009/0246025 A1 10/2009 Lewke et al.
2009/0272557 A1* 11/2009 Mogensen ............. H02G 13/00 174/2
2009/0284019 A1* 11/2009 Molbech .................. H01R 4/20 290/55
2010/0188790 A1* 7/2010 Llorente Gonzalez ..................... F03D 1/065 361/117
2012/0020791 A1* 1/2012 Flemming ............. H02G 13/00 416/146 R (Continued)

FOREIGN PATENT DOCUMENTS

| CA | 2977379 A1 | 9/2016 |
| CN | 105604812 A | 5/2016 |

(Continued)

OTHER PUBLICATIONS

Search Report for German Patent Application No. 10 2017 007 371.6 dated Jun. 6, 2018.

(Continued)

Primary Examiner — Woody A Lee, Jr.
(74) Attorney, Agent, or Firm — Alix, Yale & Ristas, LLP (57) ABSTRACT Method for retrofitting a lightning protection device of a rotor blade of a wind turbine. In the method, a cable section of a lightning protection cable is stripped of insulation. A connection piece and a lightning protection receptor are fitted to the cable section which is stripped of insulation, so that the lightning protection receptor is electrically coupled to the lightning protection cable. The invention also relates to a rotor blade which is retrofitted using the method. The risk of lightning strikes in specific regions of a rotor blade can be reduced by the invention by means of the retrofitting operation.

14 Claims, 4 Drawing Sheets (56) References Cited

U.S. PATENT DOCUMENTS

| | | | | |
|---|---|---|---|---|
| 2013/0181457 | A1* | 7/2013 | Lyngby | H01T 4/08 |
| | | | | 290/55 |
| 2014/0341738 | A1* | 11/2014 | Bech | F03D 1/0675 |
| | | | | 416/146 R |
| 2016/0090968 | A1* | 3/2016 | Hansen | H01Q 1/22 |
| | | | | 416/146 R |

FOREIGN PATENT DOCUMENTS

| | | |
|---|---|---|
| DE | 102005051537 A1 | 5/2007 |
| DE | 102006055751 B3 | 3/2008 |
| EP | 2404056 B1 | 7/2017 |
| WO | 2011080177 A1 | 7/2011 |
| WO | 2016165714 A1 | 10/2016 |

OTHER PUBLICATIONS

European Search Report dated Dec. 19, 2018 for European Patent Application No. 18187442.1.

* cited by examiner

ROTOR BLADE OF A WIND TURBINE AND METHOD FOR RETROFITTING A LIGHTNING PROTECTION DEVICE OF A ROTOR BLADE

BACKGROUND

The invention relates to a method for retrofitting a lightning protection device of a rotor blade of a wind turbine. The invention also relates to a rotor blade of a wind turbine.

Lightning protection devices of wind turbines generally comprise lightning protection receptors which are arranged on the rotor blade tips and are designed to capture lightning strikes. The electrical charge which is transmitted with the lightning is routed away via an electrical conductor path which extends from the blade tip receptor to the ground. In this way, the lightning is discharged by means of the lightning protection device, without the wind turbine being damaged.

The electrical conductor path comprises a lightning protection cable which is electrically connected to the blade tip receptor. Even if the lightning protection cable has an insulation, it may be the case that lightning does not hit the blade tip receptor, but rather directly strikes the lightning protection cable. This can cause damage to the lightning protection cable and to adjacent regions of the rotor blade.

SUMMARY OF THE INVENTION

Objects of the invention are to present a rotor blade and also a method for retrofitting a lightning protection device, with which rotor blade and method the risk of damage by lightning strikes can be reduced. Proceeding from said prior art, the object is achieved by the features of the independent claims. Advantageous embodiments are specified in the dependent claims.

In the method according to the invention, a cable section of a lightning protection cable is stripped of insulation. A connection piece and a lightning protection receptor are fitted to the cable section which is stripped of insulation, so that the lightning protection receptor is electrically coupled to the lightning protection cable.

The invention has identified that individual sections of a lightning protection cable can be effectively protected against damage by lightning strikes in this way. If it is found during operation of a wind turbine that a particular section of the lightning protection cable is particularly susceptible to lightning strikes, the lightning protection receptor according to the invention can be retrofitted there. The lightning protection receptor attracts lightning strikes, so that a region of the lightning protection cable, which region is adjacent to the connection piece, is also protected against damage by lightning strikes. Usually, only a few regions of a lightning protection cable are at an increased risk of lightning strikes. These are usually regions in which the cable either is routed close to the surface or is deflected. Lightning protection of a rotor blade can often be considerably improved by a single retrofitted lightning protection receptor or at least a small number of lightning protection receptors.

The lightning protection cable can extend in the interior of a rotor blade of the wind turbine. One end of the lightning protection cable can be connected to a blade tip adapter. A blade tip adapter is an electrically conductive element which captures lightning which strikes in the region of the blade tip and conducts said lightning into the lightning protection cable. Another end of the lightning protection cable can be arranged in the region of the blade root and can be electrically coupled to a conductor which is arranged in the rotor hub. If the rotor blade is rotatably mounted relative to the rotor hub, electrical coupling with which the bearing can be bridged is required. The electrical coupling can be DC coupling which can extend, for example, across a slip ring contact. Electrical coupling across a spark gap is also possible. In the event of a lightning strike, a voltage is briefly produced which is so high that a discharge builds up across the spark gap, it being possible for high current intensities to be discharged via said discharge.

The lightning protection cable can be routed at a distance from an outer surface of the rotor blade. This can be the case, in particular, for the cable section which is stripped of insulation as part of the method according to the invention. For example, this cable section can be routed along an inner surface of the outer skin of the rotor blade. The distance between the lightning protection cable and the outer surface of the rotor blade is then so low that there is a certain probability of lightning strikes through the outer skin of the rotor blade into the lightning protection cable.

The lightning protection cable can comprise an electrical conductor, for example in the form of a copper cable, and also an insulating layer which surrounds the electrical conductor. Stripping of insulation means that an insulating layer which surrounds the electrical conductor of the cable is opened, so that the electrical conductor is accessible. In particular, it is possible for the insulating layer to be completely removed in the cable section which is stripped of insulation. The cable section which is stripped of insulation can extend, for example, over a length of between 4 cm and 10 cm. The insulating layer preferably remains unchanged in the regions which adjoin the cable section which is stripped of insulation.

The connection piece can be configured such that its extent along the lightning protection cable corresponds at least to the length of the cable section which is stripped of insulation. As a result, the connection piece can be arranged such that it completely covers the cable section which is stripped of insulation. The extent of the connection piece along the lightning protection cable is preferably at least 5%, preferably at least 10%, further preferably at least 20%, greater than the length of the cable section which is stripped of insulation. This provides the option of arranging the connection piece such that it overlaps with the intact region of the insulating layer.

In the assembled state, the connection piece can surround the cable section which is stripped of insulation completely in the circumferential direction. In this way, the connection piece can prevent undesired electrical contact from the electrical conductor to the outside.

The connection piece can comprise a first shell part and a second shell part, which shell parts are separate from one another before assembly and are connected to one another in the assembled state. The two shell parts can enclose the cable section which is stripped of insulation between them in the assembled state. In this case, the two shell parts can be clamped to one another and/or to the cable section which is stripped of insulation.

The shell parts can be clamped to one another by a clamping device. The clamping device can comprise, for example, one or more screw bolts which are routed through a bore in one of the shell parts in each case, so that said shell part can be clamped to the other shell part by tightening the screw bolt.

In one embodiment, the connection piece has a circular shape with respect to a plane which is parallel to the longitudinal direction of the cable section which is stripped of insulation. The cable section which is stripped of insulation can extend along a diameter of the circular shape.

The connection piece can have a core which is composed of an electrically conductive material, such as brass or copper for example. In the assembled state of the connection piece, the electrically conductive material can be in direct electrical contact with the cable section which is stripped of insulation. In particular, the electrically conductive material can lie flat on the cable section which is stripped of insulation over the entire length and/or over the entire circumference.

The electrically conductive material of the connection piece can be surrounded by an electrically insulating casing. Therefore, undesired electrical contacts on the connection piece to the outside can be avoided.

In the assembled state, the lightning protection receptor can be connected to the connection piece. The connection piece then forms the connection between the lightning protection cable and the lightning protection receptor in the assembled state, so that the lightning protection receptor is mechanically held in position and is electrically coupled to the lightning protection cable. The electrical coupling between the lightning protection receptor and the lightning protection cable can be the result of a direct electrical contact between the lightning protection receptor and the lightning protection cable or of a direct electrical contact which extends from the lightning protection cable, via the connection piece, to the lightning protection receptor. Electrical coupling in this sense can also be provided without direct electrical contact, for example when there is an air gap between two components and said air gap is bridged by a discharge in the event of a lightning strike. It is critical for the electrical coupling that the electrical charges which are introduced into the lightning protection receptor in the event of a lightning strike can be transmitted to the lightning protection cable.

The lightning protection receptor can be fixedly or releasably connected to the connection piece. In the case of a releasable connection, the lightning protection receptor is first connected to the connection piece and then the connection piece is fitted to the cable section which is stripped of insulation in one variant of the method according to the invention. In another variant, the connection piece is first fitted to the cable section which is stripped of insulation, and the lightning protection receptor is then connected to the connection piece.

The releasable connection between the lightning protection receptor and the connection piece can be a screw connection. The screw connection can extend in the radial direction with respect to the cable section which is stripped of insulation.

The lightning protection receptor can have a receptor surface which is accessible from outside the rotor blade. The lightning protection receptor can extend through the outer skin of the rotor blade. The receptor surface can terminate flush with the surrounding outer surface of the rotor blade. It is also possible for the receptor surface to protrude to a slight extent or be recessed to a slight extent in relation to the surrounding outer surface of the rotor blade. If lightning hits the receptor surface, the electrical charge can be conducted into the lightning protection cable, without the surrounding outer skin of the rotor blade being damaged.

The receptor surface can have a diameter of between 1 cm and 5 cm, preferably between 2 cm and 4 cm. The receptor surface can be circular. An engagement element for a tool can be formed in the receptor surface. The engagement element can comprise, for example, one or more bores in the receptor surface, it being possible for a wrench to engage into said bore or bores in order to tighten or to loosen the screw connection between the lightning protection receptor and the connection piece.

The lightning protection receptor can be composed of stainless steel. This has the advantage that a receptor surface of the lightning protection receptor, which receptor surface is exposed to the weather influences, does not corrode. The receptor surface can be arranged at a distance of between 1 m and 5 m from the blade tip.

When the lightning protection cable is routed in the interior of the rotor blade, direct access to the lightning protection cable from the outside is not possible. The method according to the invention can therefore comprise the step of creating an access to the lighting protection cable through the outer skin of the rotor blade. The access opening in the outer skin is preferably dimensioned such that the lightning protection cable can be accessed through the access opening, so that a cable section of the lightning protection cable can be stripped of insulation. The method according to the invention can therefore be carried out such that the lightning protection cable is accessed through an access opening in the outer skin of the rotor blade in order to strip insulation from a section of the lightning protection cable.

The access opening in the outer skin can be dimensioned such that the connection piece or a shell part of the connection piece can be inserted into the interior of the rotor blade through the access opening. The diameter of the access opening can lie, for example, between 5 cm and 15 cm. The access opening can have a circular cross section.

Since the space conditions in the interior of the rotor blade are occasionally confined, it may be advantageous to make a first access opening and a second access opening in the outer skin of the rotor blade, where the first and the second access opening are arranged such that the lightning protection cable is accessible from two sides. Then, a first shell part of the connection piece can be routed through the first access opening, and a second shell part of the connection piece can be routed through the second access opening. The two shell parts can be connected to one another in the interior of the rotor blade, so that said shell parts enclose the cable section which is stripped of insulation between them.

After the connection piece and the lightning protection receptor are fitted, the access opening in the outer skin of the rotor blade can be closed again. Closing can be performed such that the re-established outer skin of the rotor blade terminates flush with a circumferential surface of the lightning protection receptor or with the circumference of the receptor surface. The access opening can be closed in accordance with the instructions provided by the blade manufacturer. Several layers which are composed of a fiber-reinforced material are usually laminated in order to close the access opening.

The method according to the invention can be carried out as an upgrading method in which an undamaged rotor blade is subsequently (that is to say after commissioning) equipped with an additional lightning protection receptor. This can be performed, for example, with the objective of bringing the rotor blade into line with a higher-level lightning protection standard.

It is also possible to carry out the method according to the invention as a repair method. If a lightning strike into the lightning protection cable occurs, both the outer skin of the rotor blade and also the lightning protection cable are generally damaged in this region, so that repair is necessary. In conventional repair methods for cables, further electrically conductive material is usually added to the site of damage in order to correct damage to the cable. However, owing to the additional electrically conductive material, the probability of further lightning strikes at precisely this location is increased. By employing the repair method according to the invention, lightning strikes are deflected in a targeted manner to the additional receptor, so that the electrical charge can be discharged without damage to the rotor blade.

The invention also relates to a rotor blade of a wind turbine, in which rotor blade a connection piece and a lightning protection receptor are fitted to a cable section, which is stripped of insulation, of a lightning protection cable, so that the lightning protection receptor is electrically coupled to the lightning protection cable, where the lightning protection receptor extends through a region, which is subsequently closed, in the outer skin of the rotor blade. The region, which is subsequently closed, of the outer skin corresponds to that region in which an access opening was made when carrying out the method, in order to be able to insert the connection piece or a component of the connection piece into the interior of the rotor blade.

The rotor blade can be developed with further features which are described in connection with the method according to the invention. The method can be developed with further features which are described in connection with the rotor blade according to the invention.

BRIEF DESCRIPTION OF THE DRAWINGS

The invention will be described by way of example below on the basis of advantageous embodiments with reference to the appended drawings, in which.

DETAILED DESCRIPTION

Figure 1:
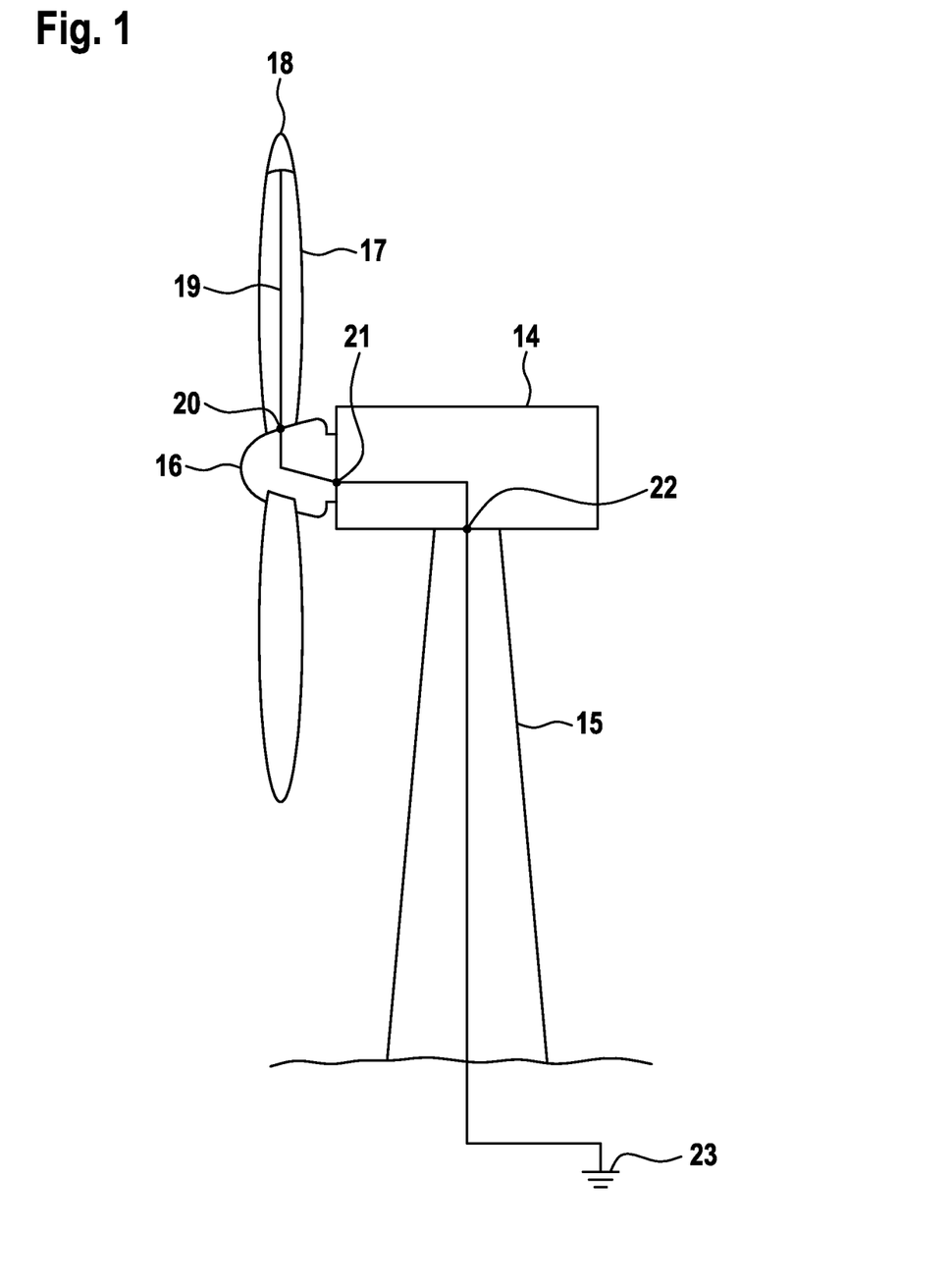
FIG. 1 shows a wind turbine comprising a rotor blade according to the invention.

In a wind turbine shown in FIG. 1, a nacelle 14 is rotatably mounted on a tower 15. The nacelle 14 is fitted with a rotor comprising a rotor hub 16 and three rotor blades 17. The rotor 16, 17 is made to rotate by wind. The rotation is transmitted to a generator by means of a rotor shaft and a gear mechanism. The generator generates electrical energy which is fed into a power grid.

Each of the rotor blades 17 is equipped with a lightning protection device which is illustrated only using the example of the upwardly pointing rotor blade 17 in FIG. 1. The blade tip of the rotor blade 17 is equipped with a blade tip receptor 18 which is composed of a metal material. A lightning protection cable 19 which extends as far as the root of the rotor blade 17 is connected to the blade tip receptor 18. Components of the wind turbine which are moved relative to one another during operation of the wind turbine meet one another at the transition 20 between the rotor blade 17 and the rotor hub 16, at the transition 21 between the rotor hub 16 and the nacelle 14 and also at the transition 22 between the nacelle 14 and the tower 15. Sections of the lightning protection cable are electrically coupled to one another by slip ring contacts and/or spark gaps in the region of the transitions 20, 21, 22. This results in a continuous lightning down conductor which extends from the blade tip receptor 18 to the ground 23.

The rotor blade 17 is constructed from an electrically non-conductive material, so that lightning is primarily conducted to the blade tip receptor 18. The electrical charge which is transmitted with the lightning is discharged from the blade tip receptor 18, via the lightning down conductor, to the ground 23, without other components of the wind turbine being damaged.

It may occasionally be the case that lightning does not hit the blade tip receptor 18, but rather directly finds the lightning protection cable 19. The lightning then passes through the outer skin of the rotor blade 17 and the insulation of the lightning protection cable 19, as a result of which the rotor blade 17 is damaged. It is often the case that the sections of the lightning protection cable 19 which are particularly susceptible to lightning strikes are discovered only during operation of the wind turbine. Using the method according to the invention, the wind turbine can be retrofitted, so that damage by lightning strikes in the affected section of the lightning protection cable 19 is avoided.

Figure 2:
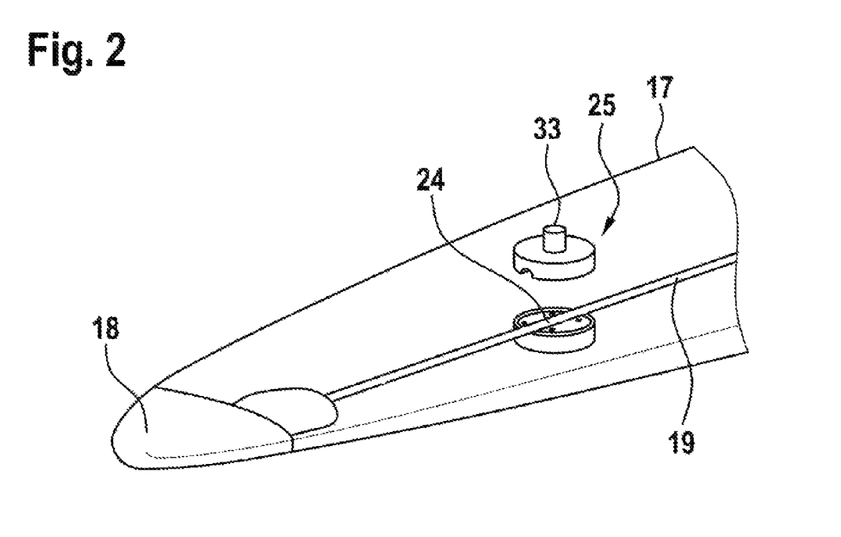
FIG. 2 shows the blade tip section of a rotor blade according to the invention.

FIG. 2 shows that section of the rotor blade 17 which is adjacent to the blade tip. The lightning protection cable 19 has a cable section 24 which is at an increased risk of lightning strikes. In the method according to the invention, the cable section 24 is stripped of insulation 41. A connection piece 25 and an additional lightning protection receptor 33 are fitted to the cable section 24 which is stripped of insulation 41. Lightning which hits the lightning protection receptor 26 can be conducted into the lightning protection cable 19, without the rotor blade 17 being damaged.

Figure 3:
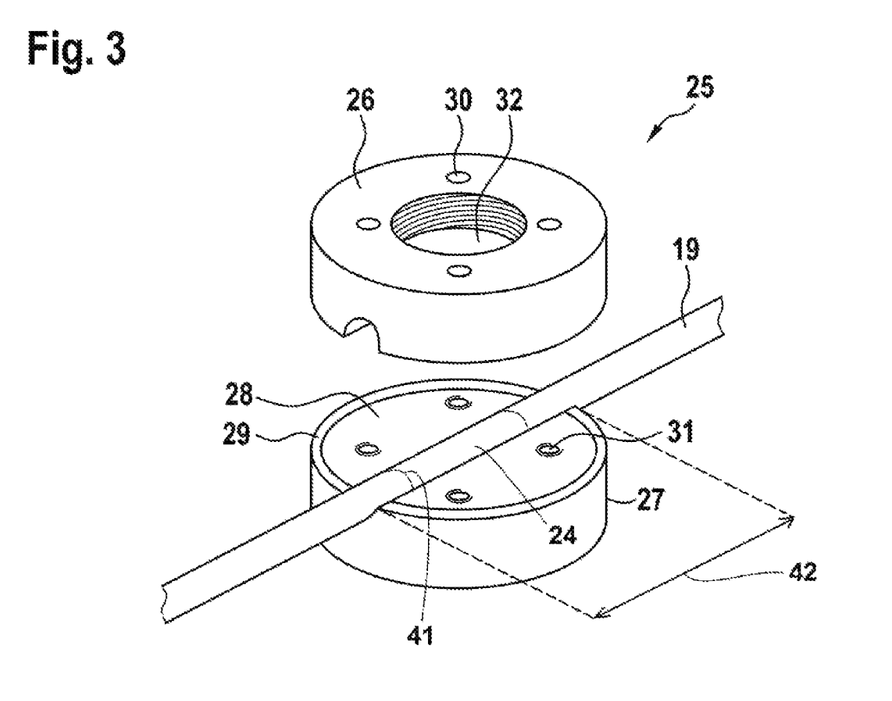
FIG. 3 shows a connection piece according to the invention.

According to FIG. 3, the connection piece 25 comprises an upper shell part 26 and a lower shell part 27. The two shell parts 26, 27 each have a recess which matches the lightning protection cable 19. When the two shell parts 26, 27 are put together, the recesses rest flat on the surface of the cable section 24 which is stripped of insulation 41 over the entire circumference and the entire length of the cable section 24 which is stripped of insulation. The connection piece 25 has an extent 42 along the lightning protection cable 19 that is at least as long as the length of the cable section 24 that is stripped of insulation 41. As a result, the connection piece 25 can be arranged so that it completely covers the cable section 24 which is stripped of insulation 41. The extent 42 of the connection piece is preferably at least 5%, 10%, or at least 20% greater than the length of the cable section 24 which is stripped of insulation 41. This ensures the connection piece 25 will overlap with the intact region of the insulation 41.

The connection piece 25 has a core 28 which is composed of an electrically conductive material and has an electrically insulating casing 29. The electrically conductive core 28 is in direct electrical contact with the cable section 24 which is stripped of insulation 41. The insulating casing terminates with the electrically insulating layer of the lightning protection cable 19 next to the cable section 24 which is stripped of insulation 41.

The two shell parts 26, 27 are connected to one another by means of four screw bolts. The upper shell part 26 comprises four passage bores 30 which are arranged such that they do not meet the lightning protection cable 19. The lower shell part 27 has four blind hole bores 31 which match said four passage bores and are equipped with an internal thread. The screw bolts are routed through the passage bores 30 and engage in the blind hole bores 31. The two shell parts 26, 27 are connected to one another by tightening the screw bolts, so that a coherent connection piece 25 is produced.

The upper shell part 26 comprises a blind hole 32 of a relatively large diameter, in which blind hole an internal thread is likewise formed. The lightning protection receptor 33 is screwed into the blind hole 32, said lightning protection receptor being shown on an enlarged scale in FIG. 4.

Figure 4:
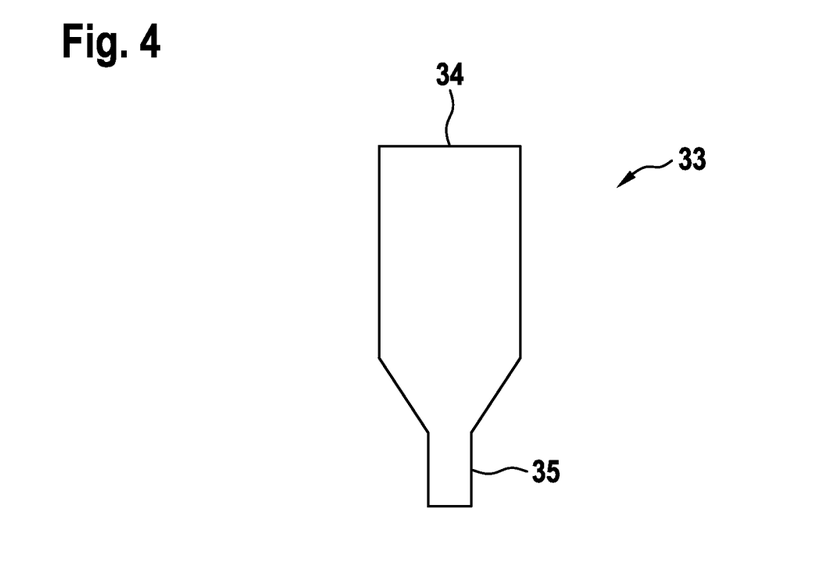
FIG. 4 shows a side view of a lightning protection receptor according to the invention.
Figure 5:
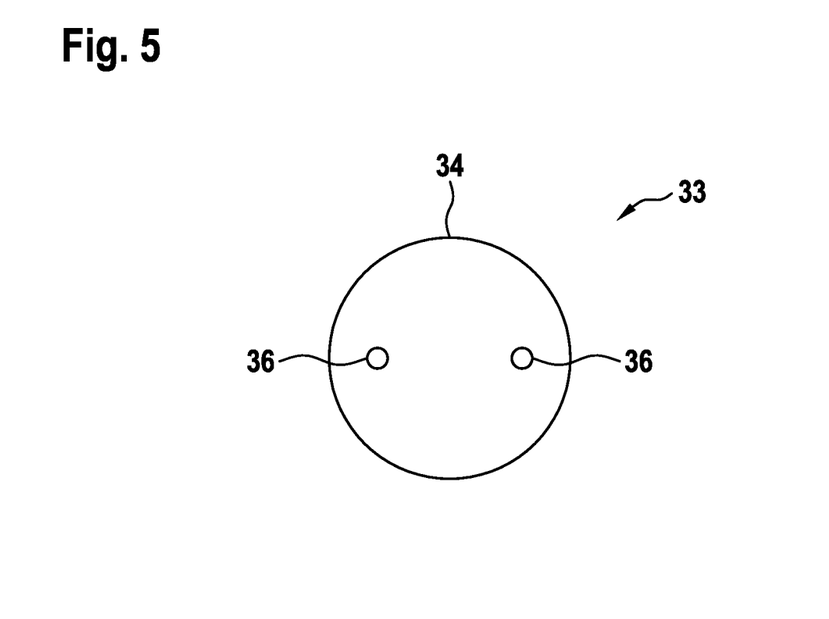
FIG. 5 shows a view of the lightning protection receptor according to FIG. 4 from above.

The lightning protection receptor 33 is composed of stainless steel and extends downward from a receptor surface 34 in the form of a cylinder. The cylindrical section merges with a screw bolt section 35 by way of a conical transition. The screw bolt section 35 matches the blind hole bore 32 in the upper shell part 26 of the connection piece 25. Two bores 36 are formed in the receptor surface 34, it being possible for a wrench to engage into said two bores in order to be able to exert a torque when screwing in the lightning protection receptor 33.

When the lightning protection receptor 33 is screwed into the connection piece 25, direct electrical contact is produced, this leading from the receptor surface 34, via the connection piece 25 and the cable section 24 which is stripped of insulation 41, into the lightning protection cable 19.

The course of the repair method according to the invention is shown in FIGS. 6A-6D. According to FIG. 6A, a lightning strike causes damage in the outer skin 38 of the rotor blade 17 and in the lightning protection cable 19 in the region 37 of the rotor blade 17. According to FIG. 6B, a first access opening 39 is made in the outer skin 38 of the rotor blade 17 by a hole cutter. The first access opening 39 has a circular cross section and is arranged such that the damaged material of the outer skin 38 is completely removed. The damaged section of the lightning protection cable 29 is accessible through the first access opening 39. A few centimeters of the insulating layer of the lightning protection cable 29 are removed on either side of the site of damage, so that a cable section 24 which is stripped of insulation is produced.

Figure 6A:
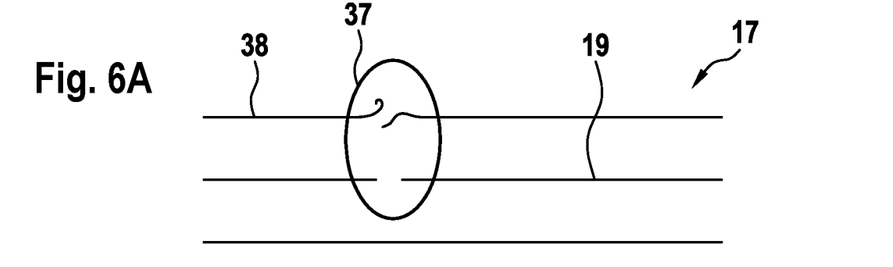
FIGS. 6A-6D show a schematic illustration of the repair method according to the invention.
Figure 6B:
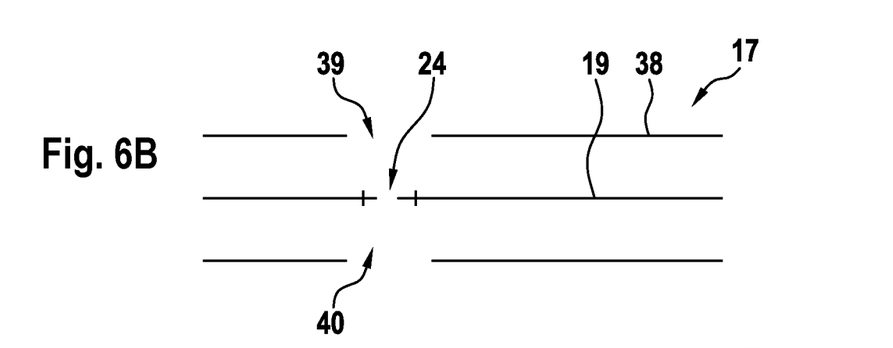

A second access opening 40 is made opposite the first access opening 39, so that the cable section 24 which is stripped of insulation is accessible from two sides. The diameter of the first access opening 39 is somewhat larger than the diameter of the upper shell part 26 of the connection piece 25. The diameter of the second access opening 40 is somewhat larger than the diameter of the lower shell part 27 of the connection piece 25.

Figure 6C:
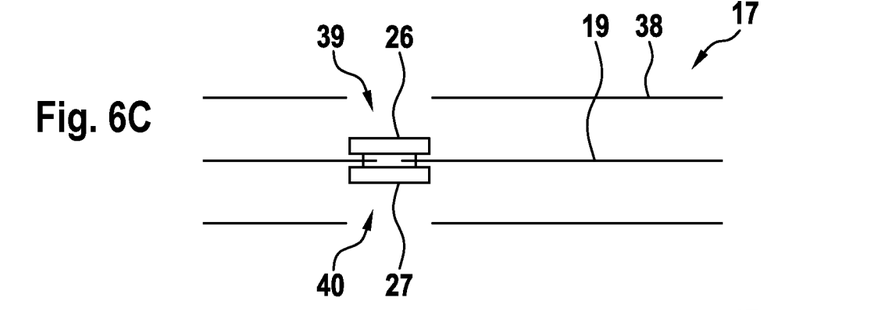

According to FIG. 6C, the upper shell part 26 is inserted into the interior of the rotor blade 17 through the first access opening 39 and the lower shell part 27 is introduced into said interior of the rotor blade 17 through the second access opening 40, so that the cable section 24 which is stripped of insulation is covered by the shell parts 26, 27.

Figure 6D:
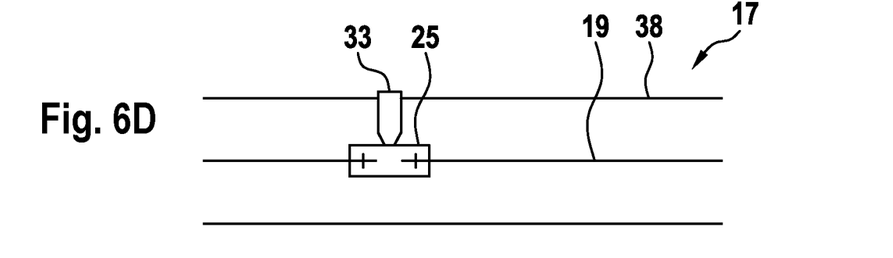

According to FIG. 6D, a connection piece 25 which is fixedly connected to the lightning protection cable 19 is produced after the two shell parts 26, 27 are connected to one another. The lightning protection receptor 33 is screwed into the connection piece 25 from above, so that the receptor surface 34 faces outward and protrudes to a slight extent in relation to the outer skin 38 of the rotor blade 17. The two access openings 39, 40 are closed again by lamination. At the first access opening 39, the repaired outer skin 38 terminates flush with a circumferential surface of the lightning protection receptor 33.

The rotor blade 17 is again ready for use in this state. The risk of damage occurring again owing to a lightning strike in this region of the rotor blade 17 is reduced.

The invention claimed is:

1. A method for retrofitting a lightning protection device of a rotor blade (17) of a wind turbine, the rotor blade (17) comprising a lightning protection cable (19) surrounded by insulation (41), wherein the rotor blade (17) has an outer skin (38) defining a hollow interior of the rotor blade (17) and the lighting protection cable (19) extends in the interior of the rotor blade (17), said method comprising:
   making a first access opening (39) to the lightning protection cable (19) through the outer skin (38) of the rotor blade (17);
   stripping the insulation (41) from a cable section (24) of the lightning protection cable (19); and
   fitting a connection piece (25) and a lightning protection receptor (33) to said cable section (24) so that the lightning protection receptor (33) is electrically coupled to the lightning protection cable (19).

2. The method of claim 1, wherein said step of fitting comprises:
   securing the connection piece (25) to said cable section (24); and
   mounting said lightning protection receptor (33) to said connection piece (25),
   wherein said lightning protection receptor (33) is electrically coupled to the lightning protection cable (19) by direct electrical contact between the lightning protection receptor (33) and the lightning protection cable (19) or by an electrical connection from the lightning protection cable (19) to the lightning protection receptor (33) via the connection piece (25).

3. The method of claim 1, wherein said step of stripping the insulation (41) from the cable section (24) comprises stripping the insulation (41) over a length of between 4 cm and 10 cm of said lightning protection cable (19).

4. The method of claim 1, comprising the step of:
   providing a connection piece (25) that extends along a length (42) of the lightning protection cable (19) which is greater than the length of the cable section (24) which is stripped of insulation.

5. The method of claim 1, comprising the steps of:
   providing a connection piece (25) comprising a first shell part (26) and a second shell part (27), which shell parts are separate from one another; and
   said step of fitting a connection piece (25) and a lightning receptor (33) comprises:
   connecting said first shell part (26) to said second shell part (27) enclose the cable section (24) which is stripped of insulation between them.

6. The method of claim 1, comprising the step of:
   providing a connection piece (25) having an electrically conductive core (28) and an electrically insulating casing (29).

7. The method of claim 1, comprising the step of:
   providing a connection piece (25) and a lightning protection receptor (33) connected to the connection piece (25) by a threaded connection.

8. The method of claim 1, comprising the step of:
   making a second access opening (40) to the lightning protection cable (24) through the outer skin (38) of the rotor blade (17), so that the lightning protection cable (24) is accessible from a second side.

9. The method of claim 1, comprising the step of:
closing the first access opening (39) after the connection piece (25) and the lightning protection receptor (33) are fitted to said cable section (24).

10. The method of claim 8, comprising the step of:
closing the first access opening (39) and the second access opening (40) after the connection piece (25) and the lightning protection receptor (33) are fitted to said cable section (24).

11. The method as claimed in claim 9, wherein the lightning protection receptor (33) extends through the re-closed outer skin (38) of the rotor blade (17).

12. The method of claim 1, wherein said rotor blade (17) or said lightning protection cable (19) are damaged and said method is carried out as a repair method.

13. The method of claim 1, wherein said rotor blade (17) and said lightning protection cable (19) are not damaged and the method is carried out as an upgrading method.

14. A rotor blade of a wind turbine, wherein the rotor blade (17) has an outer skin (38) defining a hollow interior of the rotor blade (17) and a lighting protection cable (19) extends in the interior of the rotor blade (17), wherein the rotor blade is configured to be retrofitted by making a first access opening (39) to the lightning protection cable (19) through the outer skin (38) of the rotor blade (17), such that a connection piece (25) and a lightning protection receptor (33) are fitted to a cable section (24) of the lightning protection cable (19), which is stripped of insulation (41), such that the lightning protection receptor (33) is electrically coupled to the lightning protection cable (19), where the lightning protection receptor (33) extends through a region of the first access opening (39), which is configured to be subsequently closed, in the outer skin (38) of the rotor blade (17).

* * * * *